United States Patent
Wang et al.

(10) Patent No.: US 9,481,056 B2
(45) Date of Patent: Nov. 1, 2016

(54) METHOD OF MAKING LIGHTWEIGHT HEAT PIPE

(71) Applicant: CHAUN-CHOUNG TECHNOLOGY CORP., New Taipei (TW)

(72) Inventors: Cheng-Tu Wang, New Taipei (TW); Pang-Hung Liao, New Taipei (TW)

(73) Assignee: CHAUN-CHOUNG TECHNOLOGY CORP., New Taipei (TW)

( * ) Notice: Subject to any disclaimer, the term of this patent is extended or adjusted under 35 U.S.C. 154(b) by 207 days.

(21) Appl. No.: 14/252,694

(22) Filed: Apr. 14, 2014

(65) Prior Publication Data

US 2014/0230248 A1    Aug. 21, 2014

Related U.S. Application Data

(62) Division of application No. 13/277,090, filed on Oct. 19, 2011, now abandoned.

(51) Int. Cl.
| | |
|---|---|
| B23P 15/26 | (2006.01) |
| F28D 15/02 | (2006.01) |
| F28D 15/04 | (2006.01) |
| B21C 37/15 | (2006.01) |
| B21C 37/20 | (2006.01) |
| B21D 26/033 | (2011.01) |
| B21D 39/04 | (2006.01) |
| B21D 53/02 | (2006.01) |

(52) U.S. Cl.
CPC .............. *B23P 15/26* (2013.01); *B21C 37/154* (2013.01); *B21C 37/202* (2013.01); *B21D 26/033* (2013.01); *B21D 39/04* (2013.01); *B21D 53/02* (2013.01); *F28D 15/0283* (2013.01); *F28D 15/046* (2013.01); *Y10T 29/49353* (2015.01)

(58) Field of Classification Search
CPC ........ B23P 15/26; B23P 15/00; B21D 53/02; B21D 26/033; B21D 39/04; B21D 39/00; B21C 37/202; B21C 37/154; B21C 37/22; B21C 37/00; B21C 15/26; F28D 15/0283; F28D 15/046; F28D 15/00; F28D 17/00; F28D 19/00; F28D 20/00; Y10T 29/49353; F16L 13/14

See application file for complete search history.

(56) References Cited

U.S. PATENT DOCUMENTS

| | | | | |
|---|---|---|---|---|
| 4,765,396 | A * | 8/1988 | Seidenberg | F28D 15/043 122/366 |
| 6,725,910 | B2 * | 4/2004 | Ishida | B21C 37/151 165/104.21 |
| 7,472,479 | B2 * | 1/2009 | Hou | B23P 15/26 165/104.26 |
| 2006/0162907 | A1 * | 7/2006 | Wu | F28D 15/046 165/104.26 |
| 2006/0179653 | A1 * | 8/2006 | Sun | B22F 3/10 29/890.032 |
| 2011/0297269 | A1 * | 12/2011 | Pilon | B22F 5/106 138/141 |
| 2013/0048250 | A1 * | 2/2013 | Pokharna | F28F 21/084 165/104.26 |

* cited by examiner

*Primary Examiner* — David Bryant
*Assistant Examiner* — Lawrence Averick
(74) *Attorney, Agent, or Firm* — Chun-Ming Shih; HDLS IPR Services

(57) ABSTRACT

A method of making a lightweight heat pipe includes steps of: a) preparing a first hollow pipe and a second hollow pipe making of two different materials; b) disposing the first hollow pipe into the second hollow pipe along an axial direction of the second hollow pipe; c) making an inner wall surface of the second hollow pipe attached on an outer wall surface of the first hollow pipe to combine the first and the second hollow pipes as a pipe body of the heat pipe; and d) vacuuming an inner space of the first hollow pipe, and sealing the pipe body after working fluid is filled in the inner space of the first hollow pipe to finish the heat pipe.

5 Claims, 7 Drawing Sheets

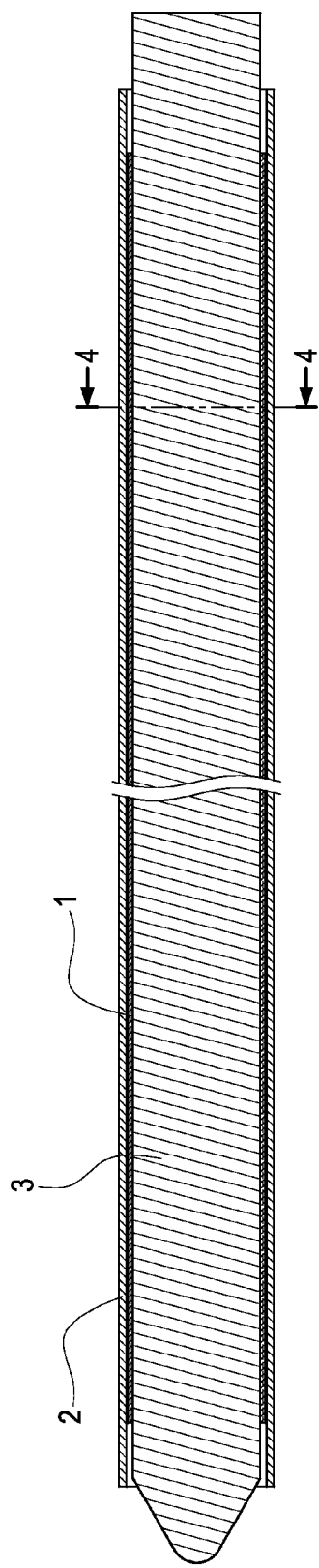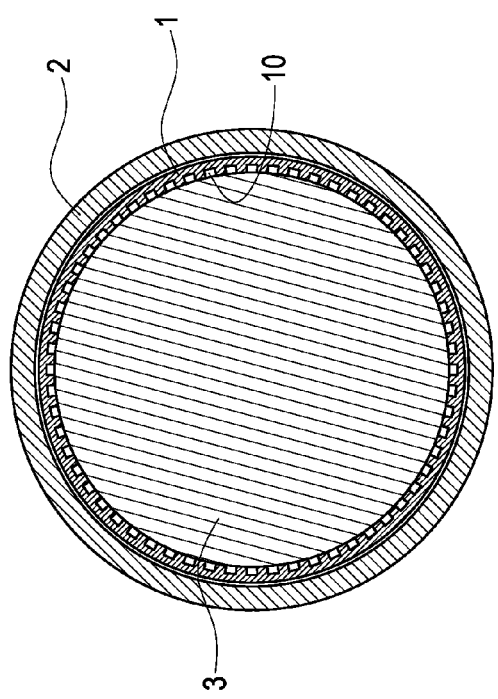

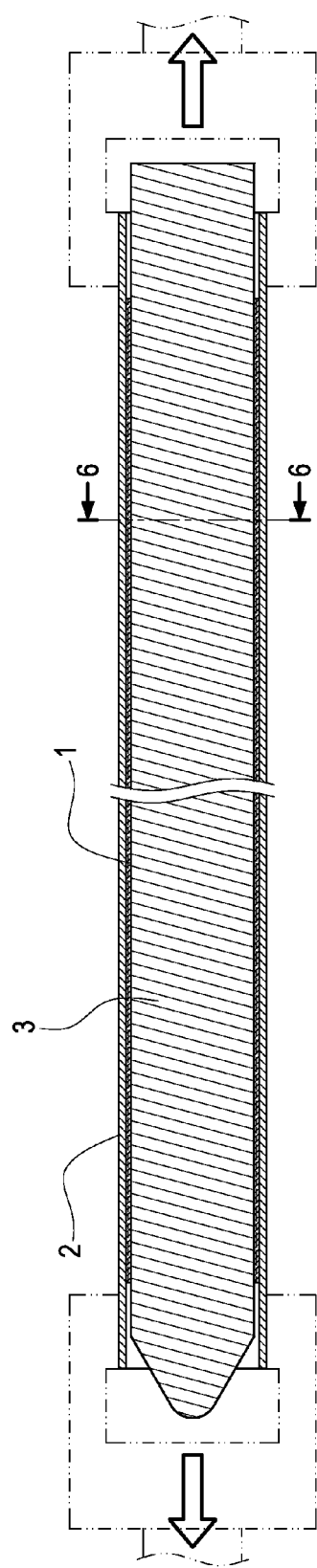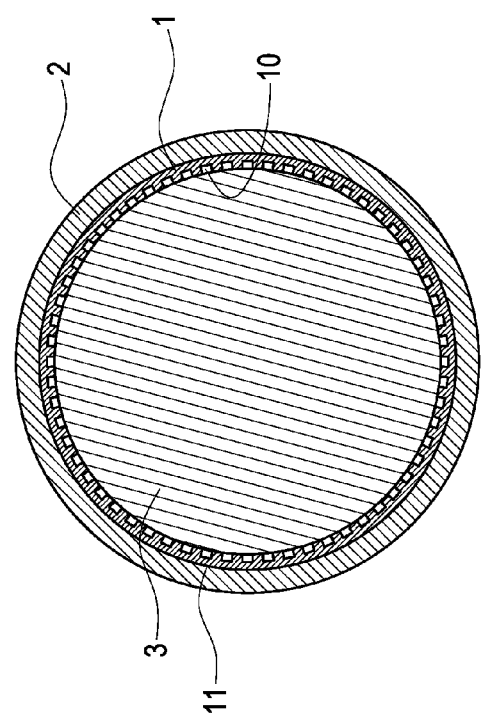

METHOD OF MAKING LIGHTWEIGHT HEAT PIPE

CROSS-REFERENCE TO RELATED APPLICATION

This application is a divisional application of U.S. application Ser. No. 13/277,090 filed on Oct. 19, 2011. The entire disclosure is incorporated herein by reference.

FIELD OF THE INVENTION

The present invention relates to a heat pipe manufacturing technology, in particular to a lightweight heat pipe and method of making the same.

BACKGROUND OF THE INVENTION

Conventional heat pipe is made of copper material because the copper has good thermal conductive efficiency and heat-dissipation characteristic, etc.; therefore the heat pipe can provide better performance.

However, the copper may not be light enough so that when the heat pipe is applied to a heat sink installed on an electronic component, such as a central processing unit (CPU), the heat sink may be too heavy, especially when there are several heat pipes arranged on the heat-dissipating fins of the heat sink. In turn, the total weight of the heat sink will be increased to add loading to the main board so as to cause the main board easily having problems of bending, deformation and so on. Besides, the heavier heat sink also increases burdens and risks on transportation for either parts or end products of the heat sinks.

In view of the drawbacks of the conventional heat pipe, the inventor of the present invention based on years of experience in the related industry to conduct extensive researches and experiments, and finally developed a feasible design to overcome the aforementioned drawbacks of the prior art.

SUMMARY OF THE INVENTION

The present invention is to provide a lightweight heat pipe and a method of making the same. By using two materials with different specific gravities to make a pipe body of a heat pipe, the weight of the heat pipe can be reduced because of the material with smaller specific gravity.

According to the present invention, the method of making a lightweight heat pipe comprises steps of: a) preparing a first hollow pipe and a second hollow pipe making of two different materials; b) disposing the first hollow pipe into the second hollow pipe along an axial direction of the second hollow pipe; c) making an inner wall surface of the second hollow pipe attached on an outer wall surface of the first hollow pipe to combine the first and the second hollow pipes as a pipe body of the heat pipe; and d) vacuuming an inner space of the first hollow pipe, and sealing the pipe body after working fluid is filled in the inner space of the first hollow pipe to finish the heat pipe.

According to the present invention, the lightweight heat pipe comprises a first pipe and a second pipe enclosing the first pipe; and an inner wall surface of the second pipe attached on an outer wall surface of the first pipe, wherein the first and the second pipes are made of two materials with different specific gravities.

BRIEF DESCRIPTION OF THE DRAWINGS

FIG. 3 is a cross sectional view showing a heat pipe is assembled in the step S2 of the method according to FIG. 1;

FIG. 4 is a cross sectional view of FIG. 3 along a line 4-4;

FIG. 5 is a cross sectional view showing a pipe body of a heat pipe is finished in the step S3 of the method according to FIG. 1;

FIG. 6 is a cross sectional view of FIG. 5 along a line 6-6;

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

The present invention is to provide a lightweight heat pipe and a method of making the same. By using two materials with different specific gravities to make a pipe body of a heat pipe, the weight of the heat pipe can be reduced because of the material with smaller specific gravity.

Figure 1:
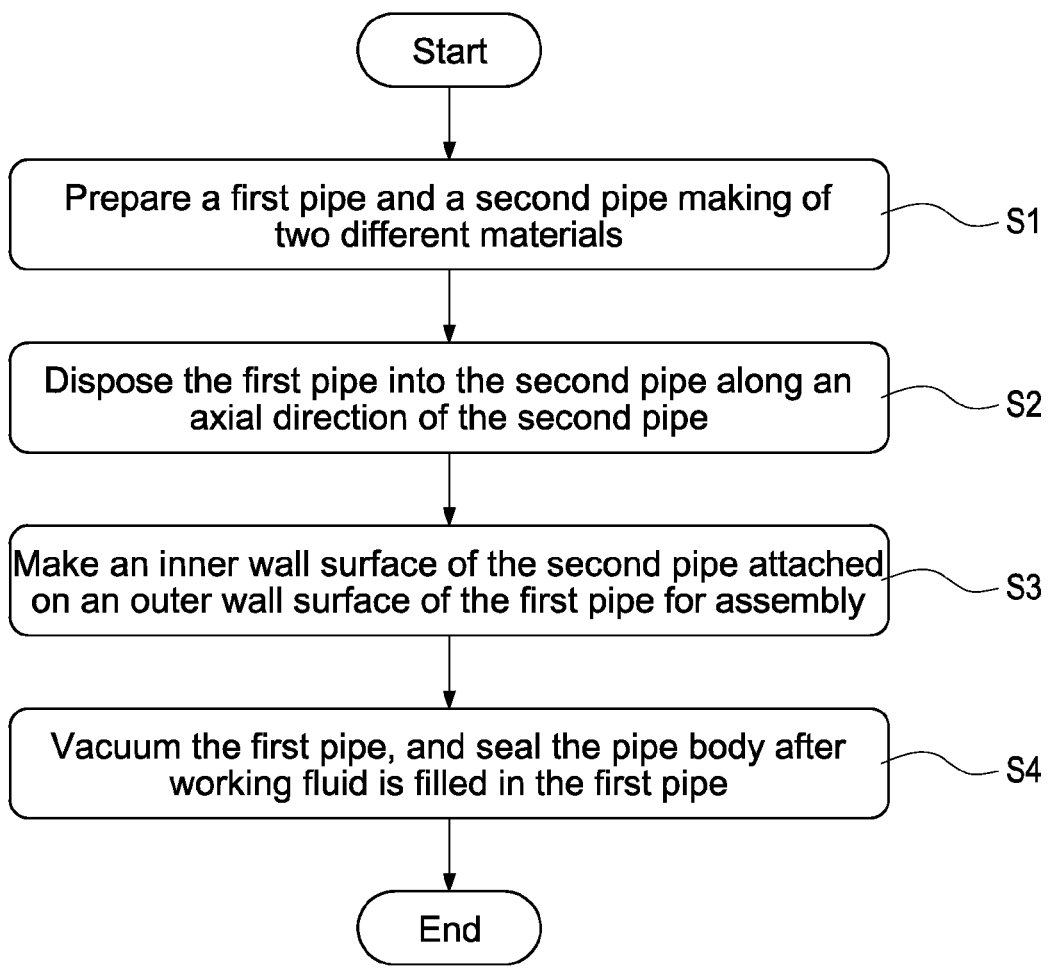
FIG. 1 is a flowchart of a method for making a lightweight heat pipe according to the present invention.
Figure 2:
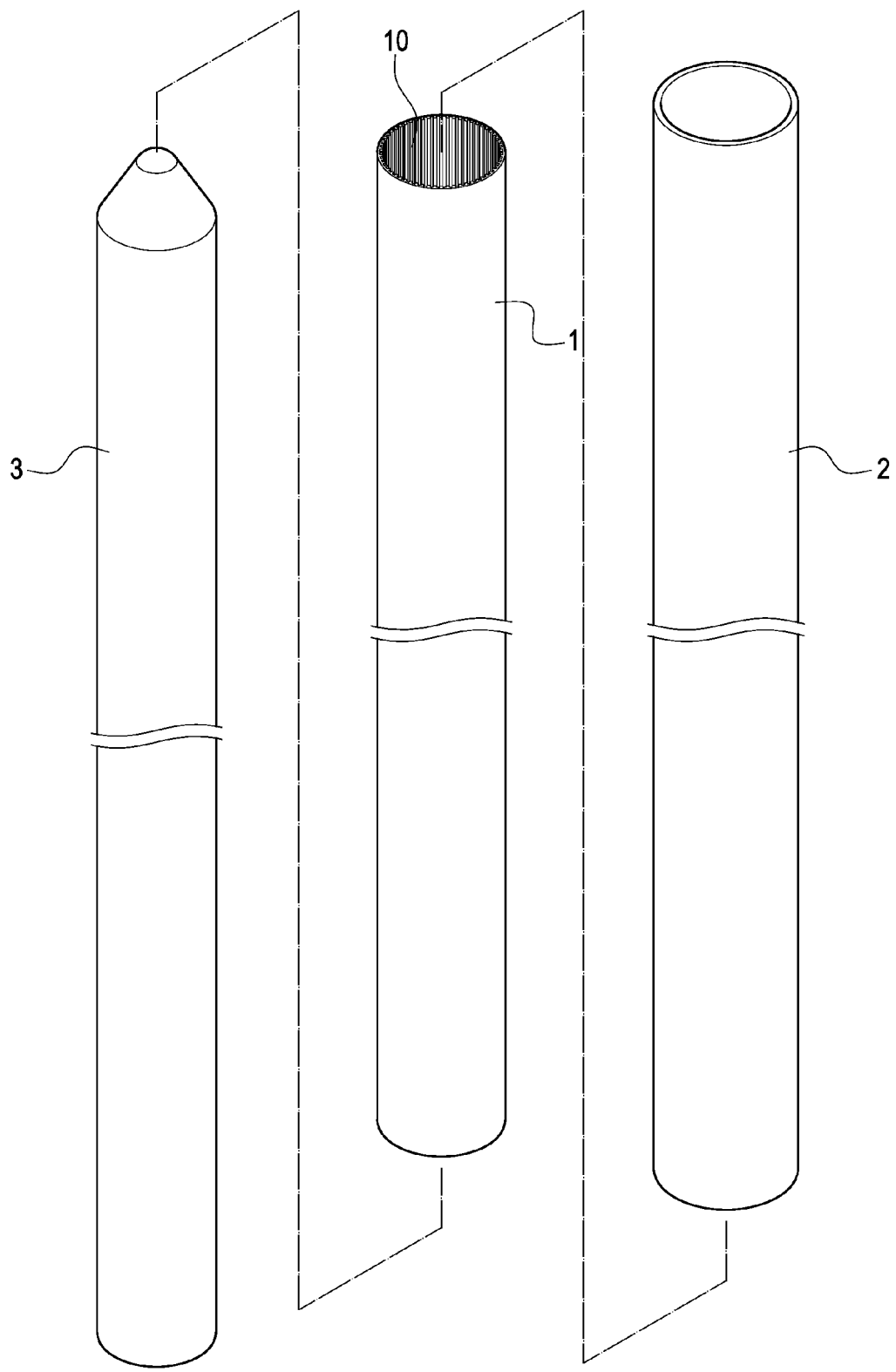
FIG. 2 is a perspective view showing a heat pipe is prepared for assembly in the step S1 of the method according to FIG. 1.

Please refer to FIG. 1 and FIG. 2. First, in the step S1, a first hollow pipe 1 and a second hollow pipe 2 are provided, and an outer diameter of the first pipe 1 is smaller than an inner diameter of the second pipe 2. The first pipe 1 and the second pipe 2 are made of two materials with different specific gravities. In one embodiment, the first pipe 1 is made of copper with a specific gravity as 8.9 and the second pipe 2 is made of aluminum with a specific gravity as 2.1. The first pipe 1 and the second pipe 2 can be both made by a drawing process, and a grooved wick structure 10 can be simultaneously formed on an inner wall of the first pipe 1 while forming the first pipe 1 by the drawing process.

Please refer to FIG. 1 and FIG. 3. In the step S2, the first pipe 1 is disposed inside the second pipe 2 so that the second pipe 2 is sheathed on the first pipe 1 to enclose the first pipe 1. At this time, the first pipe 1 and the second pipe 2 has not closely attached to each other yet. That is, as shown in FIG. 4, there is a gap 21 formed between an outer wall surface 11 of the first pipe 1 and an inner wall surface 20 of the second pipe 2; therefore, the first pipe 1 and the second pipe 2 is not completely combined together. Moreover, in this step, it can further prepare a rod 3, preferably a solid rod 3 or a rod with better surface strength, to pass through and dispose inside the first pipe 1 so that the first pipe 1 is prevented from collapse or deformation.

Please refer to FIG. 1 and FIG. 5. In the step S3, via an operation, the inner wall surface 20 of the second pipe 2 is attached on the outer wall surface 11 of the first pipe 1 to combine the first pipe 1 and the second pipe 2 as a pipe body of the heat pipe. In one embodiment, the operation is performed by placing the second pipe 2 in a high temperature chamber to soften the material of the second pipe 2 and pulling the second pipe 2 from two ends thereof by a tool. Such that, the inner diameter of the second pipe 2 is reduced and the inner wall surface 20 of the second pipe 2 will be attached on the outer wall surface 11 of the first pipe 1, as shown in FIG. 6. Alternatively, it can be made by shrinking the second pipe 2 or expanding the first pipe 1 to achieve the object for combining the first pipe 1 and the second pipe 2 with the outer wall surface 11 of the first pipe 1 and the inner wall surface 20 of the second pipe 2 being closely attached to each other.

Figure 7:
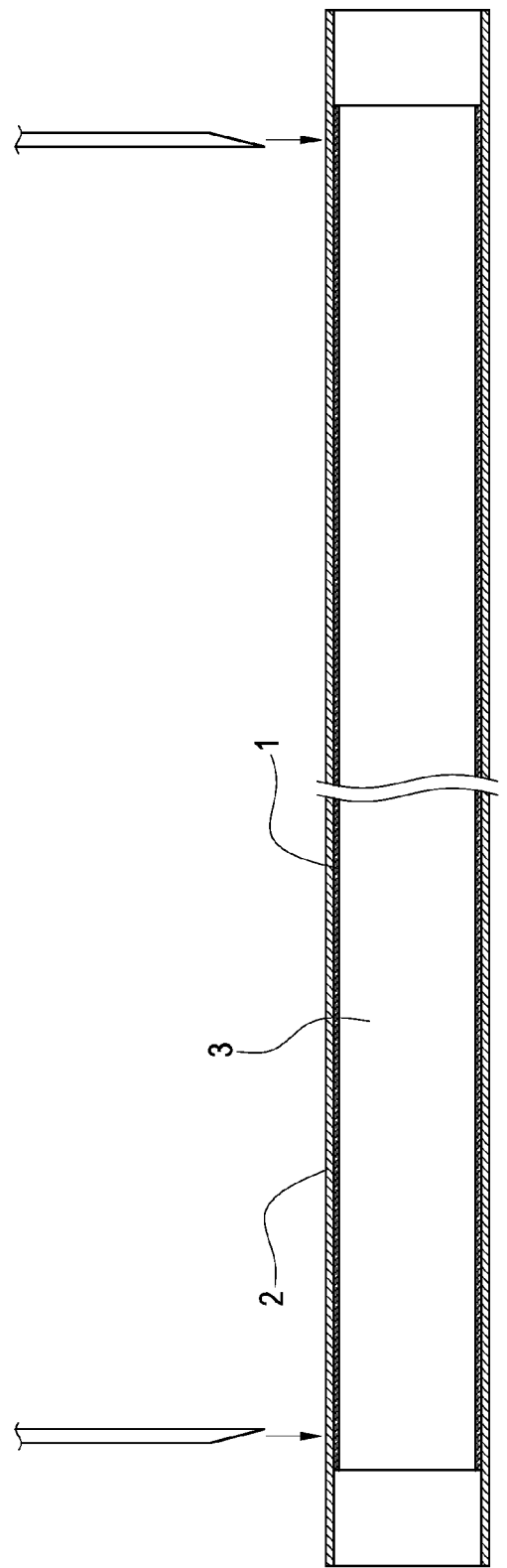
FIG. 7 is a cross sectional view showing a heat body of a heat pipe is cut according to the present invention.

Referring to FIG. 7, after the step S3, in order to obtain a more accurate length of the heat pipe, a cutting step can be performed to cut the closely attached first and second pipes 1 and 2 to get a heat pipe with a length in requirement.

Figure 8:
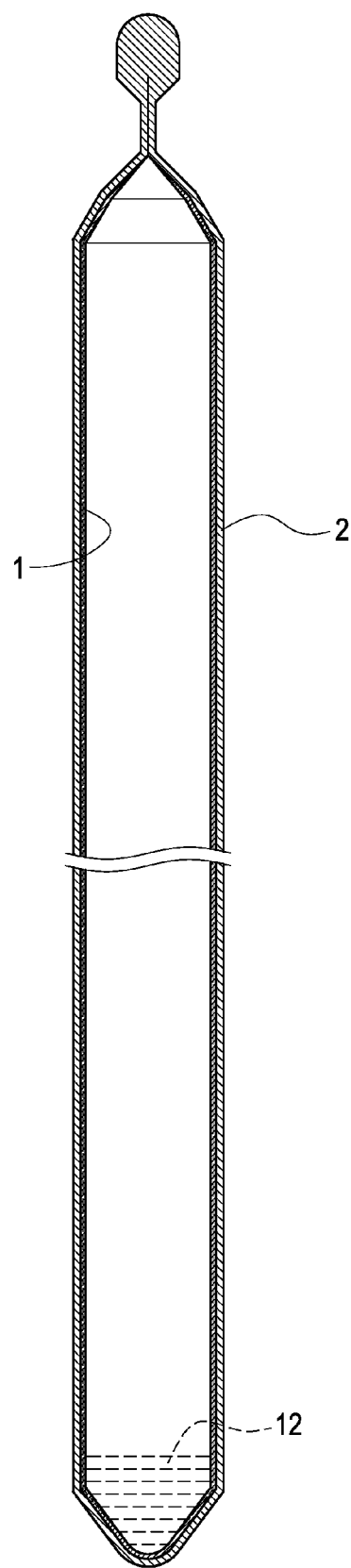
FIG. 8 is a cross sectional view showing a heat pipe is finished in the step S4 of the method according to FIG. 1.
Figure 9:
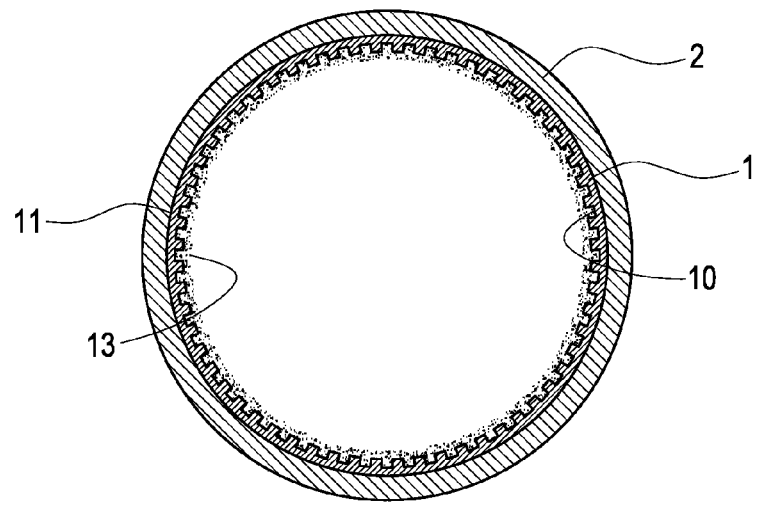
FIG. 9 is a cross sectional view of a heat pipe according to another embodiment of the present invention.
Figure 10:
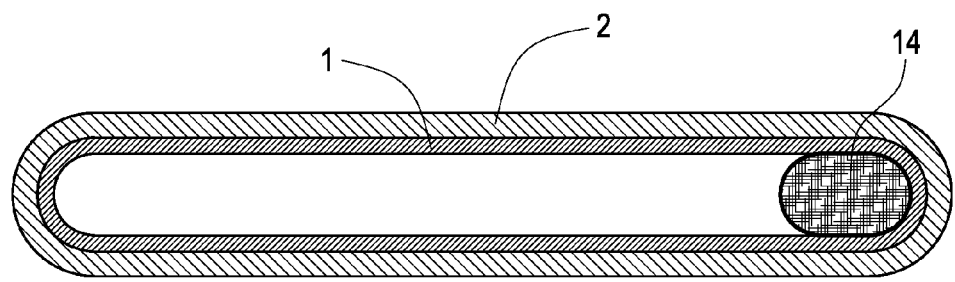
FIG. 10 is a cross sectional view of a heat pipe according to still another embodiment of the present invention.

Finally, please refer to FIG. 1 and FIG. 8. In the step S4, a vacuuming process is performed to vacuum an inner space of the first pipe 1, and a sealing process is performed on the first pipe 1 and the second pipe 2 after the working fluid is filled in the first pipe 1 to finish the heat pipe. Moreover, before the step S4, it can depend on the practical demand to form a screen mesh wick in the first pipe 1 or further form a powder sintered wick 13 (as shown in FIG. 9) entirely or locally on the grooved wick structure 10. On the other hand, the closely attached first and second pipes 1 and 2 can be pressed to form as a thin flat heat pipe with a screen mesh 14 located along a longitudinal direction of the heat pipe as shown in FIG. 10

Thus, a lightweight heat pipe made by the above-mentioned steps of the method according to the present invention can be obtained.

By using the copper material to make the inner pipe and the aluminum material to make the outer pipe of a heat pipe, since the aluminum material has a specific gravity much smaller than the copper material which is conventionally solely used for making the heat pipe, the lightweight heat pipe of the present invention not only can keep the same performance on the thermal conductive effect, but also can reduce the entire weight of the heat pipe.

While the invention has been described by means of specific embodiments, numerous modifications and variations could be made thereto by those skilled in the art without departing from the scope and spirit of the invention set forth in the claims.

What is claimed is:

1. A method of making a lightweight heat pipe, comprising steps of:
    a) preparing a first hollow pipe and a second hollow pipe making of two different materials;
    b) disposing the first hollow pipe into the second hollow pipe along an axial direction of the second hollow pipe, and further providing a rod to pass through two ends of the first pipe and two ends of the second pipe so that the rod is disposed inside the first pipe;
    c) making an inner wall surface of the second hollow pipe attached on an outer wall surface of the first hollow pipe to combine the first and the second hollow pipe as a pipe body of the heat pipe by pulling the second pipe from the two ends of the second pipe to reduce an inner diameter of the second pipe; and
    d) vacuuming an inner space of the first hollow pipe, and sealing the pipe body after working fluid is filled in the inner space of the first hollow pipe to finish the heat pipe.

2. The method of claim 1, wherein the first pipe is made of copper and the second pipe is made of aluminum.

3. The method of claim 1, wherein in the step a), a grooved wick structure is formed on an inner wall of the first pipe.

4. The method of claim 1, wherein in the step c), the second pipe is placed in a high temperature chamber to soften the material of the second pipe when pulling the second pipe.

5. The method of claim 1, further comprising a cutting step to cut the pipe body in a predetermined length after the step c).

* * * * *